US006572948B1

(12) United States Patent
Dykhoff

(10) Patent No.: US 6,572,948 B1
(45) Date of Patent: Jun. 3, 2003

(54) FIRE STOP DEVICE WITH RUPTURABLE ELEMENT

(75) Inventor: Michael G. Dykhoff, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 268 days.

(21) Appl. No.: 09/702,414

(22) Filed: Oct. 31, 2000

(51) Int. Cl.[7] ........................ A62C 37/12; A62C 37/14; B32B 3/02; B32B 1/04; B27N 9/00

(52) U.S. Cl. ........................ 428/76; 428/68; 428/913.3; 428/920; 428/921; 169/56; 169/58

(58) Field of Search ................. 169/56, 58; 428/68–76, 428/35.7, 36.92, 913, 920, 921

(56) References Cited

U.S. PATENT DOCUMENTS

| | | | | |
|---|---|---|---|---|
| 3,955,330 A | * | 5/1976 | Wendt | 52/1 |
| 4,992,310 A | * | 2/1991 | Gelb et al. | 109/80 |
| 5,032,447 A | * | 7/1991 | Bailey | 428/121 |
| 5,155,957 A | | 10/1992 | Robertson et al. | |
| 5,163,516 A | * | 11/1992 | Palmatier | 169/54 |
| 5,476,891 A | | 12/1995 | Welna | |
| 5,523,059 A | | 6/1996 | Langer | |
| 5,654,063 A | * | 8/1997 | Kirk et al. | 428/319.1 |
| 5,705,006 A | * | 1/1998 | Roudebush et al. | 156/285 |
| 5,830,319 A | | 11/1998 | Landin | |
| 5,869,010 A | | 2/1999 | Langer | |
| 5,887,395 A | | 3/1999 | Navarro et al. | |
| 5,887,396 A | * | 3/1999 | Thoreson | 52/1 |
| 5,939,676 A | | 8/1999 | Birmingham et al. | |
| 6,153,668 A | | 11/2000 | Gestner et al. | |
| 6,153,674 A | | 11/2000 | Landin | |
| 6,207,085 B1 | * | 3/2001 | Ackerman | 162/159 |
| 2001/0048985 A1 | * | 12/2001 | Lagare | 428/34.6 |

FOREIGN PATENT DOCUMENTS

| | | | | |
|---|---|---|---|---|
| DE | 43 25 966 A1 | | 2/1995 | |
| EP | 0 551 855 A1 | | 7/1993 | |
| GB | 2335481 | | 9/1999 | |
| GB | 2342136 | * | 4/2000 | F16L/5/04 |
| WO | WO 95/06173 | | 3/1995 | |
| WO | WO 95/14828 | | 6/1995 | |
| WO | WO 02/19472 | * | 3/2002 | H01R/13/527 |
| WO | WO 02/36207 | * | 5/2002 | A62C/2/06 |

OTHER PUBLICATIONS

Metacaulk® Firestop Pillows Product Data Sheet, The Rectorseal Corporation, Mar., 1998.

IPC Flamesafe® Bags Product brochure, Jun., 1999.

* cited by examiner

*Primary Examiner*—Cheryl A. Juska
*Assistant Examiner*—Lynda Salvatore
(74) *Attorney, Agent, or Firm*—David B. Patchett

(57) ABSTRACT

A fire stopping device includes a containment shell with a heat rupturable element and an intumescent filler material arranged in the containment shell. The containment shell is formed of a fire resistant material capable of containing the intumescent material after the rupturable element fails. In addition, the heat rupturable element is designed to fail at a force which is lower than the intumescent filler material expansion force. In this manner, when the intumescent filler material reaches its activation temperature, it expands with a force greater than the strength of the rupture element, thereby causing the rupture element to fail. Thus, expansion of the intumescent filler material takes place in a controlled manner via the rupture element.

15 Claims, 3 Drawing Sheets

FIRE STOP DEVICE WITH RUPTURABLE ELEMENT

FIELD OF THE INVENTION

The present invention relates generally to fire stopping devices and, more particularly, to a fire stopping device including a flexible and conformable shell filled with an intumescent material which serves to form a fire barrier in the event of a fire.

BACKGROUND OF THE INVENTION

One mechanism by which fire may spread from one compartment of a structure to another is through passages or openings, often referred to as through-penetrations, in the floors and walls. Such openings include, for example, cable access holes through which signal and power transmission cables pass.

Current methods used to prevent the spread of fire and passage of smoke through such openings include cutting two intumescent sheets to follow the contour of the penetrating cables and providing a bead of moldable intumescent putty along the perimeter of each sheet. While this technique is generally satisfactory for resisting the spread of fire and preventing the passage of smoke from one compartment to another, installation is labor intensive and time consuming. In addition, fire stops fabricated in this manner do not lend themselves to repeated re-entry.

Techniques for fire stopping through-penetrations are known in the prior art. The U.S. patent to Robertson et al. U.S. Pat. No. 5,155,957 for example, discloses a fire safety device for closing through-holes in floors and walls which includes a section of conduit, a cup-shaped retainer spaced from the outside surface of the conduit section so as to define an annular space which contains an intumescent material, and a floating floor below the intumescent material which, in the event of fire, moves inwardly to occupy the interior space previously occupied by the conduit section.

The U.S. patent to Navarro et al. U.S. Pat. No. 5,887,395 discloses a fire stop sleeve including a layer of intumescent composite forming a moldable putty with a restraining layer for wrapping around a pipe extending through a floor or the like, and further including a plurality of bendable tabs for depression into the wrapped layer to hold the restraining layer in position during installation.

The U.S. patent to Bailey U.S. Pat. No. 5,032,447 discloses a fire barrier material for use in building construction comprising a sandwich structure having first and second outside layers comprising corrugated high temperature resistant metal and at least one intermediate layer comprising a flame retardant fibrous material, wherein the corrugations are positioned on the outside layers in an array which enables the barrier material to be folded in a direction substantially perpendicular to the corrugations.

In addition, various bag-like devices for fire stopping through-penetrations are available commercially. Each of these prior devices or techniques, however, suffer from certain drawbacks or shortcomings. Accordingly, there exists a need in the industry for a pre-fabricated fire stopping device for fire stopping through penetrations which has improved fire stopping characteristics, is cost effective, and is easy to install.

SUMMARY OF THE INVENTION

The present invention provides a fire stopping device including a containment shell and a heat rupturable element which define an interior chamber, and an intumescent filler material arranged in the interior chamber. The containment shell is formed of a fire resistant material capable of retaining the intumescent material after the rupturable element fails. In addition, the heat rupturable element is designed to fail at a force which is lower than the intumescent filler material expansion force at the activation temperature of the intumescent filler material. In this manner, when the intumescent filler material reaches its activation temperature, it expands with a force greater than the strength of the rupture element, thereby causing the rupture element to fail. Thus, expansion of the intumescent filler material takes place in a controlled manner via the rupture element.

In one aspect of the invention, the rupturable element fails at a rupture temperature and the intumescent filler material intumesces at an activation temperature, and the rupture temperature is lower than the activation temperature. In another aspect, the containment shell includes a seam, and the rupturable element is a fastener which joins the seam. The fastener may be an adhesive, a stitched thread, a mechanical fastener, or another conventional fastener.

The containment shell may include separate top and bottom sheets having adjacent peripheral edges joined together to define the seam. The top and bottom sheets may be formed of the same fire resistant material or different materials. In one embodiment, the top and bottom sheets are a mat of intumescent material which may be laminated with an outer cover layer to enclose and seal the intumescent mat, thereby improving the handleability of the device.

In another aspect of the invention, the containment shell has opposed top and bottom major surfaces, and the rupturable element forms a portion of the top surface. In another aspect of the invention, the rupturable element is a seam arranged in the top surface of the containment shell. In yet another aspect, the rupturable element comprises the entire top surface of the containment shell.

In another aspect of the invention, the fire stopping device includes a sheet of infrared radiation blocking material or endothermic material provided on the inner surface of the containment shell adjacent the interior chamber. In a specific embodiment of the invention, the device includes both a sheet of infrared radiation blocking material and a sheet of endothermic material, and the sheet of endothermic material is arranged on the inner surface of the infrared radiation blocking material. In another embodiment, the fire stopping device further includes a sheet of intumescent material arranged adjacent the infrared radiation blocking material.

In yet another aspect of the invention, the intumescent filler material comprises a plurality of discrete particles. The intumescent filler material may comprise a mixture of intumescent material, insulating material, and endothermic material. Alternately, the filler material may be a moldable intumescent putty.

BRIEF DESCRIPTION OF THE DRAWINGS

The present invention will be further described with reference to the accompanying drawings, in which.

DETAILED DESCRIPTION

For the purpose of this invention, the following terms are used herein:

- "activation temperature" refers to the temperature at which an intumescent compound begins to expand or the temperature at which an endothermic compound begins to change phase, decompose, or react, thereby absorbing heat;
- "endothermic compound" refers to a material that absorbs heat, typically by releasing water of hydration, by going through a phase change that absorbs heat (i.e. liquid to gas), or by other chemical change where the reaction requires a net absorption of heat to take place;
- "intumescent compound" refers to a compound that expands to at least about 1.5 times its original volume upon heating to temperatures typically encountered in fire-like conditions.

Figure 1:
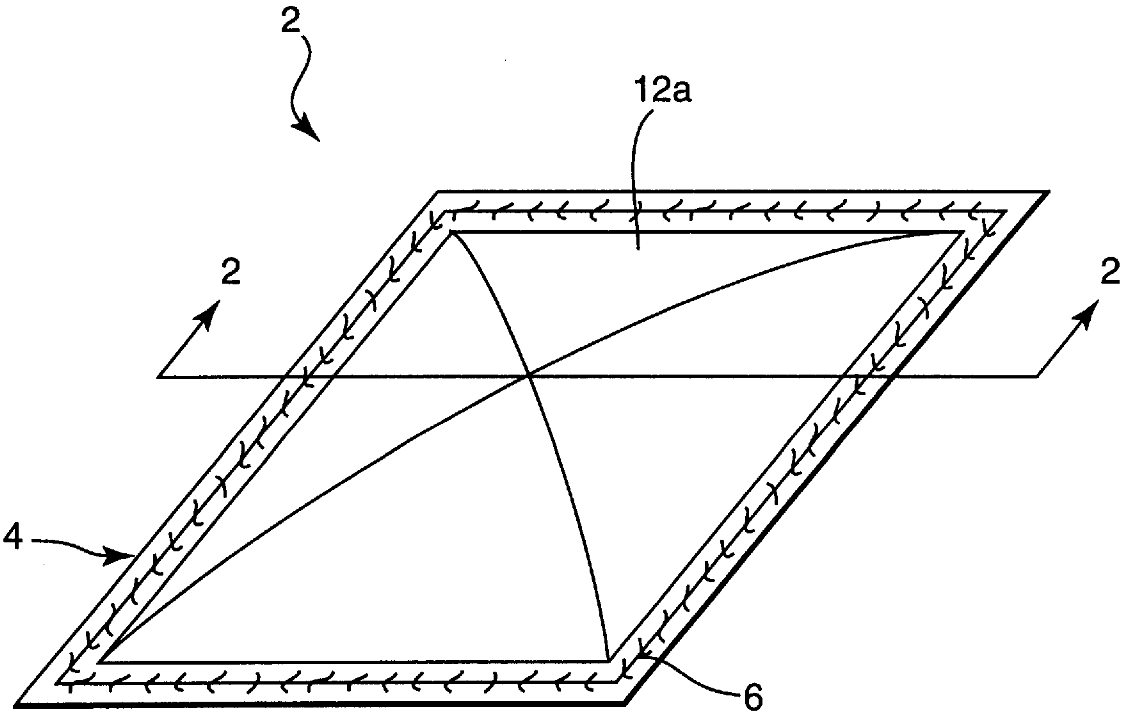
FIG. 1 is a perspective view of a fire stopping device in accordance with the invention.
Figure 2:
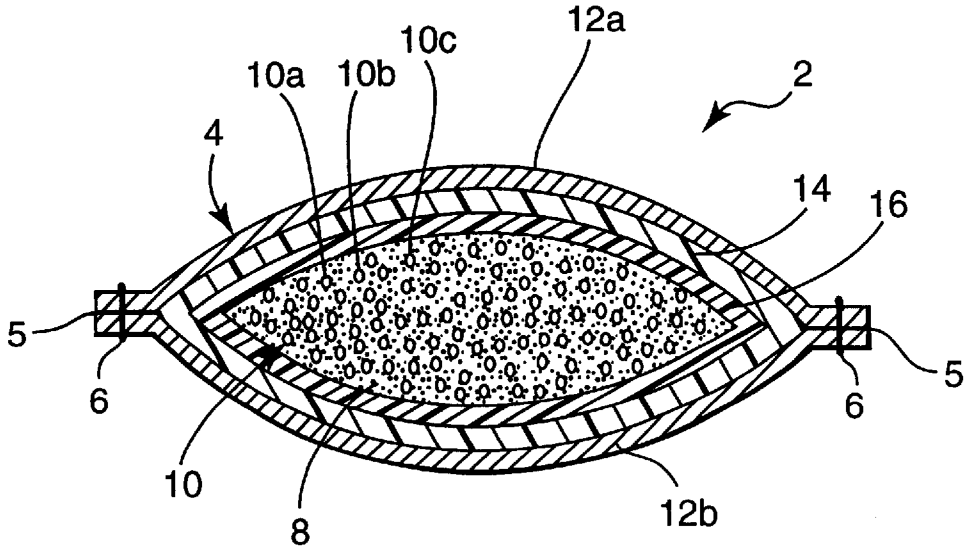
FIG. 2 is a cross-sectional view taken along line 2—2 of FIG. 1.

Referring now to the drawings, wherein like reference numerals refer to like or corresponding parts throughout the several views, FIGS. 1 and 2 show a fire stopping device 2 including a containment shell 4 with a rupturable element 6 which together define an interior chamber 8 which is filled with an intumescent filler material 10.

Prior to being exposed to fire-like conditions, the containment shell 4 serves to enclose the intumescent filler material 10 and the rupturable element 6 serves to seal or close the containment shell 4. During a fire or fire-like conditions, however, the intumescent filler material 10, upon reaching its activation temperature, will expand and exert a force, referred to as the expansion force, against the containment shell 4 and rupturable element 6. In accordance with a characterizing feature of the invention, the rupturable element 6 is designed to have a rupture strength less than the expansion force of the intumescent filler material 10 at the activation temperature of the intumescent filler material. In this manner, the rupturable element 6 provides for controlled expansion of the intumescent filler material 10.

The containment shell 4 includes top 12*a* and bottom 12*b* mats having outer adjacent edges forming a seam 5 which is stitched together by the rupturable element 6. The mats 12*a*, 12*b* are formed of a flexible conformable fire resistant material. In accordance with another characterizing feature of the invention, the fire resistant mats 12*a*, 12*b* are capable of retaining the intumescent filler material 10 in the interior chamber 8 after the rupturable element 6 has failed. Depending on the particular end use application of the device 2 and how it is arranged in the through-penetration, it will be recognized that only one of the top 12*a* and bottom 12*b* mats needs to be formed of a fire resistant material in order to retain the intumescent filler material 10 in the interior chamber 8 after the rupturable element 6 has failed. For simplicity of construction and ease of use, however, it is preferred that the top and bottom mats be formed of the same material.

Suitable fire resistant materials include 3M FIRE BARRIER FS-195+intumescent strip, INTERAM G-MAT intumescent sheet, or 3M NEXTEL AF-10 woven fabric, all available from 3M Company, St. Paul, Minn. A preferred fire resistant material is INTERAM G-MAT laminated on both sides with a fire retardant polyester cover web such as REEMAY Spunbond web #2016 306*a*', 306*a*" and 306*b*', 306*b*", respectively, available from Snow Filtration, Westchester, Ohio.

The rupturable element 6 is a stitched thread which joins the adjacent peripheral edges of the top and bottom mats 12*a*, 12*b*, respectively, and thereby serves to close the containment shell 4. A suitable rupturable element 6 is a polyester thread with a cotton wrap such as cotton core spun 60/36 polyester thread available from Eastern Woolen Company (EWC), St. Paul, Minn. Another suitable thread material is nylon bonded 69 black thread also available from EWC. Alternatively, the rupturable element may be a conventional adhesive such as a hot melt adhesive or a sealant such as Fire Barrier 2000 PLUS sealant available from 3M Company, St. Paul, Minn. Conventional mechanical fasteners such as clips and staples, or SCOTCHMATE fasteners available from 3M Company may also be used.

In the design of the fire stopping device of the present invention, it is often desirable to include an infrared radiation blocking layer. In a fire, a large proportion of the heat transferred to and across a fire stop originates as infrared radiation. Thus, a fire stop which blocks infrared radiation will minimize heat transfer which must otherwise be retarded by insulation, endothermic absorption, or other means.

In order to reduce the quantity of heat transferred across the through-penetration and thereby improve the fire stopping characteristics of the device 2, the containment shell 4 preferably includes a sheet of infrared radiation blocking material 14 arranged adjacent the top and bottom mats 12*a*, 12*b*.

Metal foils have been used as infrared radiation blocking materials to reflect a large amount of infrared radiation. When using these materials, the melting point of the metal must be taken into account so that it does not melt during the course of the fire, thereby allowing infrared radiation to reach the remaining components of the fire stop. Thus, metals with high melting points are preferred. Another preferred infrared radiation blocking material is NEXTEL FLAME STOPPING DOT PAPER available from 3M Company, St. Paul, Minn. This material and other vitreous materials reflect a large portion of radiation in the infrared spectrum and are thus useful as infrared radiation blockers. Certain examples have the further advantage of melting points above those temperatures found in most fires. Furthermore, their flexibility/drapability is higher than many metal foils.

The containment shell 4 preferably includes a sheet of endothermic material 16 arranged adjacent the infrared radiation blocking material 14. It will be recognized that the sheet of endothermic material 16 may be eliminated from the construction of the containment shell 4 or, alternatively, that its position may be switched with the position of the infrared radiation blocking material 14. As used herein, an endothermic compound is one that absorbs heat, typically by releasing water of hydration, by going through a phase change that absorbs heat (i.e. liquid to gas), or by another chemical change where the reaction requires a net absorption of heat to take place (such as the release of $NH_3$ from $MgNH_4PO_4$).

Suitable endothermic compounds include compounds which thermally decompose, typically with the evolution of one or more small molecules such as ammonia, carbon dioxide, and/or water, which volatilize, or which react with one or more other compounds present within the fire barrier material or the surrounding atmosphere in a manner which provides a net uptake of thermal energy by the system. In cases involving small molecule evolution or substantial volatilization of a constituent of the endothermic compound, some heat may be carried away from the fire barrier material and the items to be protected by the fire barrier material. Solid endothermic compounds may provide separate contributions from each of heat of fusion, heat capacity, heat of vaporization, and thermal energy lost as hot gas leaves the fire barrier material. Preferably, any volatile gas produced by the endothermic compound is not combustible.

Suitable endothermic compounds include inorganic materials which provide endothermic reaction or phase change without exothermic decomposition or combustion between 194 and 2732° F. (90 and 1500° C.). Exemplary compounds include aluminum trihydrate (ATH), $Al(OH)_3$ hydrated zinc borate ($ZnB_2O_4.6H_2O$), calcium sulfate ($CaSO_4.2H_2O$) also known as gypsum, magnesium ammonium phosphate ($MgNH_4PO_4.6H_2O$), magnesium hydroxide ($Mg(OH)_2$), and encapsulated $H_2O$. Preferred endothermic agents include magnesium ammonium phosphate hexahydrate, $MgO.2B_2O_3.9H_2O$, gypsum, and $MgHPO_4.3H_2O$.

The intumescent filler material 10 comprises a plurality of discrete particles 10*a*, 10*b*, 10*c*. The intumescent filler material includes intumescent compound and may, alternatively, include insulating material, endothermic compound, and mixtures thereof. As indicated above, an intumescent compound is one that expands to at least about 1.5 times its original volume upon heating. The quantity of intumescent compound used in the device 2 will depend on the particular end use application and the size of the through-penetration to be fire stopped, and the size of the interior chamber 8. The quantity, however, will be at least enough to cause the rupturable element 6 to fail, and will be sufficient to serve effectively as a fire stop barrier.

Exemplary intumescent compounds include intumescent graphite such as intercalated graphite and acid treated graphite, hydrated alkali metal silicates, vermiculite, perlite, NaBSi, volcanic glass with $CO_2$ blowing agent incorporated within the glass particles, mica, and mixtures thereof. The intumescent compound is preferably in the form of discrete particles which may be formed, for example, by chopping a sheet of intumescent material into smaller pieces.

Preferred intumescent graphite materials include acid intercalated graphite commercially available under the trade name GRAFGUARD 160 and GRAFGUARD 220, both from UCAR Carbon of Cleveland, Ohio. Another preferred intumescent agent is a granular hydrated alkali metal silicate intumescent composition commercially available under the trade designation EXPANTROL 4BW PLUS from the 3M Company St. Paul, Minn. or chopped INTERAM ULTRA GS intumescent and endothermic compound also available from 3M Company.

Granular hydrated alkali metal silicate intumescent compound commercially available from 3M Company, St. Paul, Minn., under the trade designation EXPANTROL 4BW PLUS is very dense and has good intumescent properties. Intumescent graphite has excellent intumescent properties and relatively low density compared with EXPANTROL 4BW PLUS and INTERAM ULTRA GS.

Additional suitable intumescent compounds are described in the U.S. patent to Langer U.S. Pat. No. 5,869,010, to Welna U.S. Pat. No. 5,476,891, to Landin U.S. Pat. No. 5,830,319, and to Langer U.S. Pat. No. 5,523,059. Suitable intumescent compounds are also described in pending U.S. patent application to Landin Ser. No. 09/016,876, and to Gestner Ser. No. 09/016,879.

Figure 3:
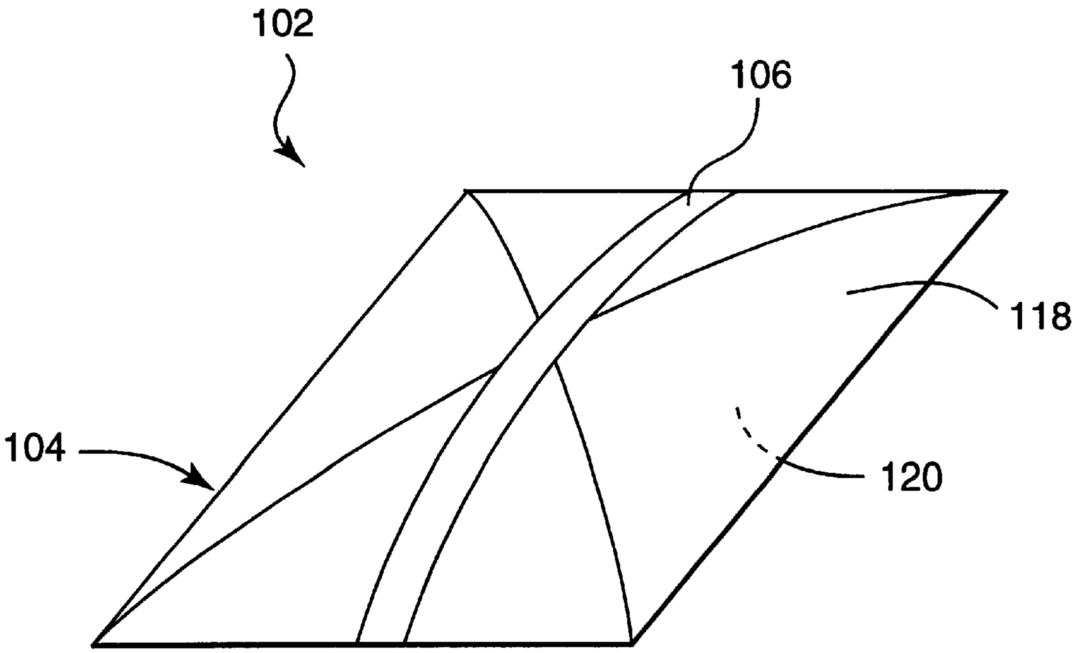
FIG. 3 is a perspective view of a second embodiment of the invention.

Referring now to FIG. 3, there is shown a fire stopping device 102 having a containment shell 104 with a top surface 118 and a bottom surface 120, wherein the rupturable element 106 forms a portion of the top surface 122. Alternatively, the rupturable element 106 may form the entire top surface 118 of the containment shell 104. The containment shell 104 is formed of a fire resistant material as described above. The rupturable element 106 is formed of a sheet-like material having a rupture strength less than the expansion force of the intumescent filler material. Thus, during expansion of the intumescent filler material, the rupturable element 106 will burst or fail before the containment shell 104 fails, and the intumescent filler material will expand through the opening in the rupturable element 106. Suitable materials for the rupturable element 106 include kraft paper, non-wovens, or a polymeric sheet material.

Figure 4:
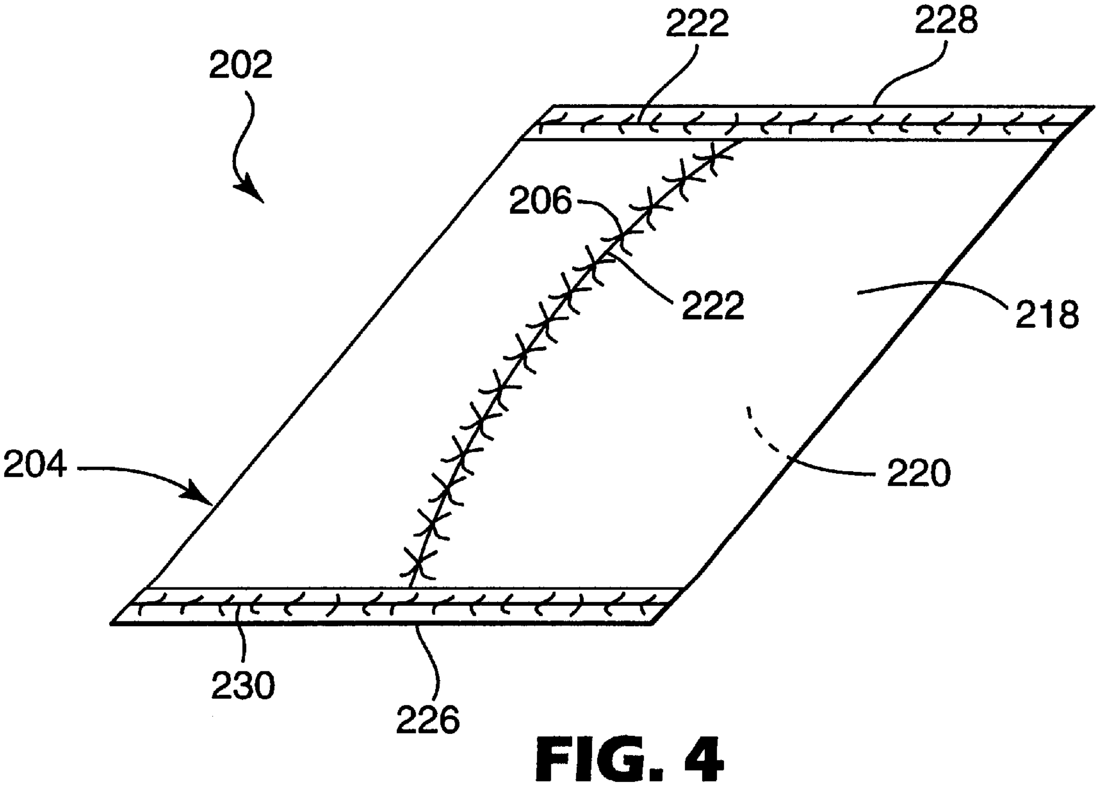
FIG. 4 is a perspective view of a third embodiment of the invention.

Referring to FIG. 4, there is shown a fire stopping device 202 having a containment shell 204 with a top surface 218 containing a seam 222, and a bottom surface 220. The seam 222 is sewn together by a rupturable element 206 which is stitched through adjacent edges of the containment member 204 which form the seam 222. Opposite sides 226, 228 of the containment shell 204 are sewn together with thread 230, 232, respectively, which may be the same material as or a different material from the rupturable element 206, thereby to close the ends of the containment shell 204. It will be recognized that the rupturable element 206 may be an adhesive or a conventional mechanical fastener as described in reference to FIGS. 1 and 2 above.

In practice, a variety of conventional support structures may be used to retain the fire stopping device in place within the through-penetration before and during exposure to fire. Since the design and use of such support structures is known to those skilled in the art, no additional description is provided.

EXAMPLE

Figure 5:
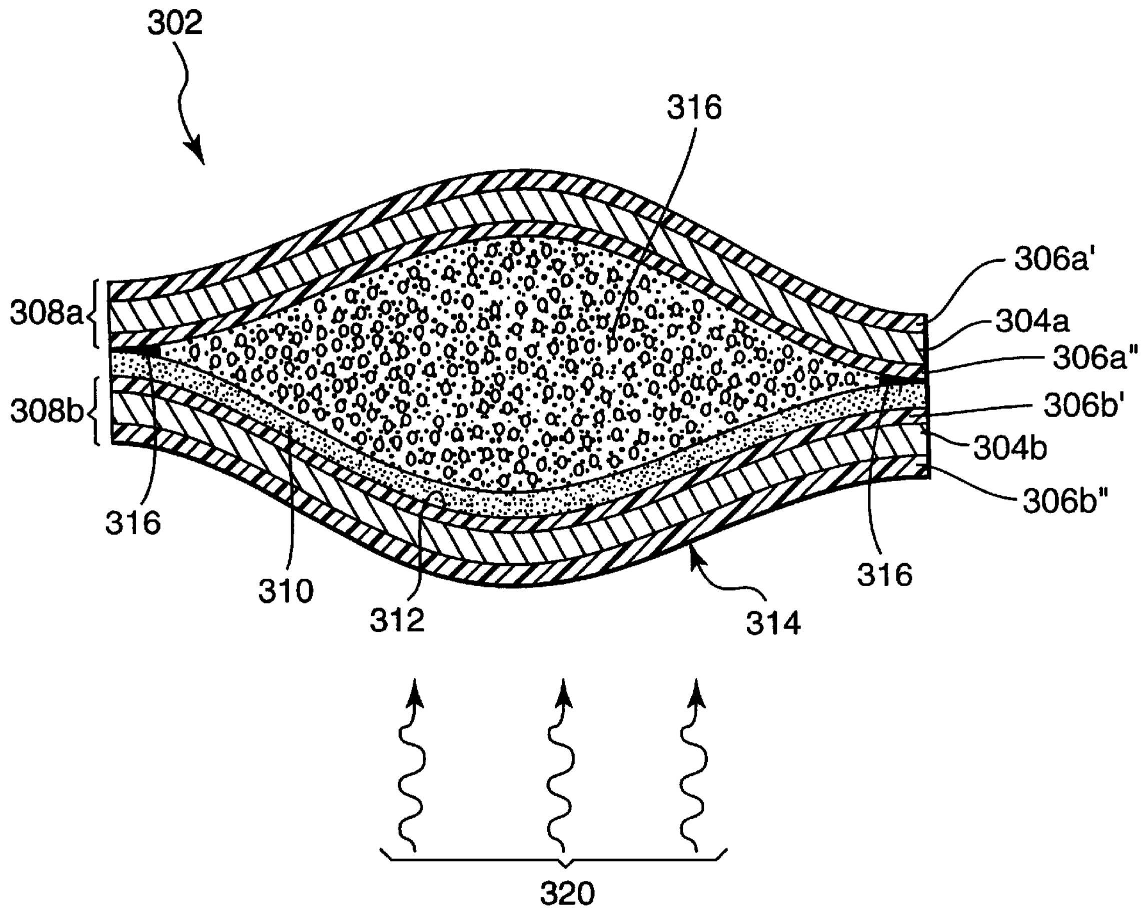
FIG. 5 is a cross-sectional view of the fire stopping device tested in the Example.

A fire stop device 302 was constructed as shown in FIG. 5. Two layers of ¼ inch INTERAM G-MAT intumescent mat 304*a*, 304*b* available from 3M Company, St. Paul, Minn. were stitch bonded on each side with layers of REEMAY STYLE #2016 FR black cover web 306*a*', 306*a*" and 306*b*', 306*b*", respectively, available from Snow Filtration, Westchester, Ohio, thereby forming a top outer layer 308*a* and bottom outer layer 308*b*, respectively, each consisting of an intumescent mat 304*a*, 304*b* sandwiched between layers of a fire retardant polyester cover web 306*a*', 306*a*" and 306*b*', 306*b*", respectively. An infrared radiation blocking layer of NEXTEL FLAME STOPPING DOT PAPER 310 available from 3M Company, St. Paul, Minn. was provided on the inner surface 312 of the bottom outer layer 308*b*. The layer of flame stopping paper 310 was found to significantly enhance the overall fire stopping capability of the device. The intumescent mats 304*a*, 304*b*, cover webs 306*a*', 306*a*" and 306*b*', 306*b*", and flame stopping paper 310 defined a containment shell 314 having a generally rectangular shape when viewed from the top or bottom. Three sides of the containment shell 314 were then sealed using Fire Barrier Silicone 2000 PLUS sealant 316, available from 3M Company, and the containment shell was filled with intumescent filler material 316. The fourth side was then sealed using Fire Barrier Silicone 2000 PLUS sealant. The intumescent filler material was chopped INTERAM Ultra GS available from 3M Company, St. Paul, Minn. The device 302 was exposed to heat on the side with the FLAME STOPPING PAPER DOT 310 as indicated by arrows 320.

When the device was tested according to ASTM E-814, the temperature limitation for the test method was met for a time of greater than 2 hours.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A fire stopping device comprising:

(a) a containment shell formed of a fire resistant material;

(b) a rupturable element arranged to close said containment shell, said rupturable element having a rupture strength, said containment shell and said rupturable element defining an interior chamber; and (c) an intumescent filler material having an activation temperature arranged within said interior chamber, said intumescent material generating an expansion force upon reaching said activation temperature;

wherein said fire resistant material is capable of retaining said intumescent material after said rupturable element fails, and further wherein said rupturable element rupture strength is lower than said intumescent filler material expansion force at said intumescent filler material activation temperature.

2. A fire stopping device as defined in claim 1, wherein said containment shell includes a seam, and said rupturable element comprises a fastener arranged to close said seam.

3. A fire stopping device as defined in claim 2, wherein said fastener comprises an adhesive.

4. A fire stopping device as defined in claim 2, wherein said fastener comprises a mechanical fastener.

5. A fire stopping device as defined in claim 2, wherein said containment shell includes a top sheet and a bottom sheet having adjacent peripheral edges joined by said fastener to define said seam.

6. A fire stopping device as defined in claim 5, wherein each of said top and bottom sheets are formed of the same fire resistant material.

7. A fire stopping device as defined in claim 1, wherein said containment shell includes opposed top and bottom major surfaces and said rupturable element forms a portion of said top surface.

8. A fire stopping device as defined in claim 7, wherein said rupturable element forms said top surface.

9. A fire stopping device as defined in claim 2, and further wherein said seam is arranged in said top surface.

10. A fire stopping device as defined in claim 1, wherein said containment shell further comprises an infrared radiation blocking material arranged adjacent said interior chamber.

11. A fire stopping device as defined in claim 10, wherein said containment shell further comprises a sheet of endothermic material arranged adjacent said infrared radiation blocking material.

12. A fire stopping device as defined in claim 11, wherein said containment shell further comprises a sheet of intumescent material arranged adjacent said infrared radiation blocking material.

13. A fire stopping device as defined in claim 1, wherein said intumescent filler material further comprises insulating material.

14. A fire stopping device as defined in claim 13, wherein said intumescent filler material comprises a plurality of discrete intumescent particles.

15. A fire stopping device as defined in claim 14, wherein said intumescent filler material further comprises an endothermic material.

* * * * *